United States Patent [19]

Rosenberg et al.

[11] Patent Number: 4,550,044
[45] Date of Patent: Oct. 29, 1985

[54] BALLISTIC RESISTANT ARMOR PANEL AND METHOD OF CONSTRUCTING THE SAME

[75] Inventors: Isadore Rosenberg, Downey; William K. Ansite, Glendale, both of Calif.

[73] Assignee: Figgie International, Inc., Willoughby, Ohio

[21] Appl. No.: 521,125

[22] Filed: Aug. 8, 1983

[51] Int. Cl.[4] ............................................. B32B 3/06
[52] U.S. Cl. .................................. 428/101; 156/290; 428/192; 428/193; 428/240; 428/242; 428/246; 428/251; 428/252; 428/283; 428/284; 428/287; 428/323; 428/408; 428/911
[58] Field of Search ............... 428/251, 252, 408, 911, 428/287, 192, 193, 284, 283, 323, 101, 240, 242, 246; 156/290

[56] References Cited

U.S. PATENT DOCUMENTS

| | | | |
|---|---|---|---|
| 3,924,038 | 12/1975 | McArdle et al. | 428/251 |
| 3,958,276 | 5/1976 | Clausen | 428/911 |
| 4,048,365 | 9/1977 | Hoover | 428/911 |
| 4,199,388 | 4/1980 | Tracy et al. | 428/911 |
| 4,200,677 | 4/1980 | Bottini et al. | 428/911 |
| 4,292,882 | 10/1981 | Clausen | 428/911 |

Primary Examiner—James J. Bell
Attorney, Agent, or Firm—Christel, Bean & Linihan

[57] ABSTRACT

A ballistic resistant armor panel and a method of constructing the same utilizes a first layer of resin-impregnated fabric, a second layer of flexible woven fabric, a border layer of resin-impregnated fabric bordering the second layer, and a third layer of resin-impregnated fabric. The percentage by weight of resin in the first layer is such that the first layer distributes the impact of a projectile which strikes its surface over a large area of the panel and effectively contributes to the ability of the panel to stop and/or slow the projectile. Furthermore, the second layer of flexible woven fabric is encapsulated by the first, border and third layers. Such a construction minimizes blunt trauma in body armor in which the panel is utilized and preserves the dry ballistic resistance of the woven fabric comprising the second layer. The panel of the invention is particularly well-suited for utilization in a helmet, and a helmet which includes such a panel possesses very good ballistic resistance.

13 Claims, 4 Drawing Figures

BALLISTIC RESISTANT ARMOR PANEL AND METHOD OF CONSTRUCTING THE SAME

BACKGROUND OF THE INVENTION

This invention relates generally to ballistic resistant armor and relates, more particularly, to an improved panel structure for such armor.

As body armor dissipates the energy of a projectile, such as a bullet or a piece of shrapnel, which strikes its surface, much of the impact of the projectile upon the armor is transferred to the wearer of the armor. The effect upon the wearer of this transferred impact is referred to as blunt trauma. If severe, blunt trauma can render the wearer stunned or unconscious. It is therefore desirable that when a projectile strikes body armor, the blunt trauma is minimized.

It is believed that the severity of blunt trauma depends, at least in part, upon the size of the area of the armor over which the impact of the projectile is distributed. More specifically, the larger or broader the area of the armor over which the impact of a projectile is distributed, the less the blunt trauma. Therefore, in order that blunt trauma be minimized, the area of the armor over which the impact of a projectile is distributed should be large.

The size of the area over which the impact of a projectile is distributed is believed to be dependant upon the rigidity of the armor. In other words, the more rigid the armor, the larger the area over which the impact of the projectile is distributed. Thus, the more rigid the armor, the less the blunt trauma.

A layer of an armor panel comprised of various conventional ballistic resistant materials can be rigidly constructed by blending a resin binder with the materials which comprise the layer. For example, it is described in U.S. Pat. No. 3,722,355 that an armor layer comprised of fabric woven of glass and nylon fibers and which is flexible without a binding resin becomes rigid and semi-structural with a binding resin. It has been discovered, however, that the ballistic resistance, or the ability to stop and/or slow projectiles, of such an armor layer decreases as its degree of rigidity is increased. Therefore, if it is desired that the armor layer comprised of various conventional ballistic materials contributes to the ballistic resistance of the armor, the degree of rigidity of the armor layer is limited.

Because of its ballistic resistance, a strong and durable fabric woven of a special aramid fiber of the type or equivalent to the type marketed by E. I. Du Pont de Nemours & Company under the tradename Kevlar is commonly utilized in lightweight ballistic resistant body armor and supported within such armor in layers. It has been discovered, however, that woven fabric of the aforedescribed type loses some of its ballistic resistance when it becomes wet. Yet, body armor in which layers of this woven fabric is used is commonly expected to be worn during a rainstorm, contacted by body perspiration, or otherwise exposed to a wet environment during its service life. If such armor does not protect its layers of woven fabric from becoming wet when the armor itself becomes wet, the effectiveness of the armor as a body-protecting shield can be seriously reduced.

It is an object of the present invention to provide an improved ballistic resistant panel which both minimizes blunt trauma and provides effective ballistic resistance, and a method of constructing the improved panel.

Another object of the present invention is to provide such a panel which is highly effective in slowing and/or stopping projectiles which impinge upon its surface.

Still another object of the present invention is to provide such a panel which is relatively light in weight.

Yet still another object of the present invention is to provide such a panel including woven fabric of the aforedescribed type and a method of constructing the same wherein the woven fabric is protected from becoming wet during the life of the panel.

A further object of the present invention is to provide such a panel which has a surface that is well-suited for finishing operations, such as sanding or painting, and requires no priming before an outside layer of paint is applied.

A still further object of the present invention is to provide such a panel which is particularly well-suited for utilization in a ballistic resistant helmet.

SUMMARY OF THE INVENTION

The present invention resides in an improved panel structure for ballistic resistant body armor and a method of constructing the improved panel.

The panel of the invention includes a layup of resin-impregnated fabric comprised of such a composition of resin and fabric that the impact of a projectile which strikes its surface is distributed over a large area of the panel while the panel provides effective ballistic resistance.

In another embodiment of the panel of the invention, the layup of resin-impregnated fabric, as aforedescribed, is a first layer and the panel further includes a second layer supported adjacent the first layer. The second layer includes at least one ply of flexible woven fabric.

In a further embodiment of the panel of this invention, the panel includes a first and second layer as in the aforedescribed another embodiment and further includes a third layer of resin-impregnated fabric supported adjacent the side of the second layer opposite the first layer. The first and third layers each define a central portion and a marginal portion bordering the central portion, and the second layer is positioned between the central portions of the first and third layers. The marginal portions of the first and third layers are bonded together so that that second layer is completely encapsulated between the first and third layers.

The method of the invention includes the steps of constructing various embodiments of the panel of the invention. The aforedescribed another embodiment is constructed by placing the first layer in overlying relationship with the second layer and suitably attaching the layers together. During the construction of the aforedescribed further embodiment, the second layer is spread over the third layer so that it overlies the central portion thereof. The first layer is then spread over the second and third layers so that its central portion overlies the second layer and its marginal portion overlies the marginal portion of the third layer. The marginal portions are then bonded together so that the second layer is completely encapsulated by the first and third layers.

DETAILED DESCRIPTION OF THE PREFERRED EMBODIMENTS

Figure 1:
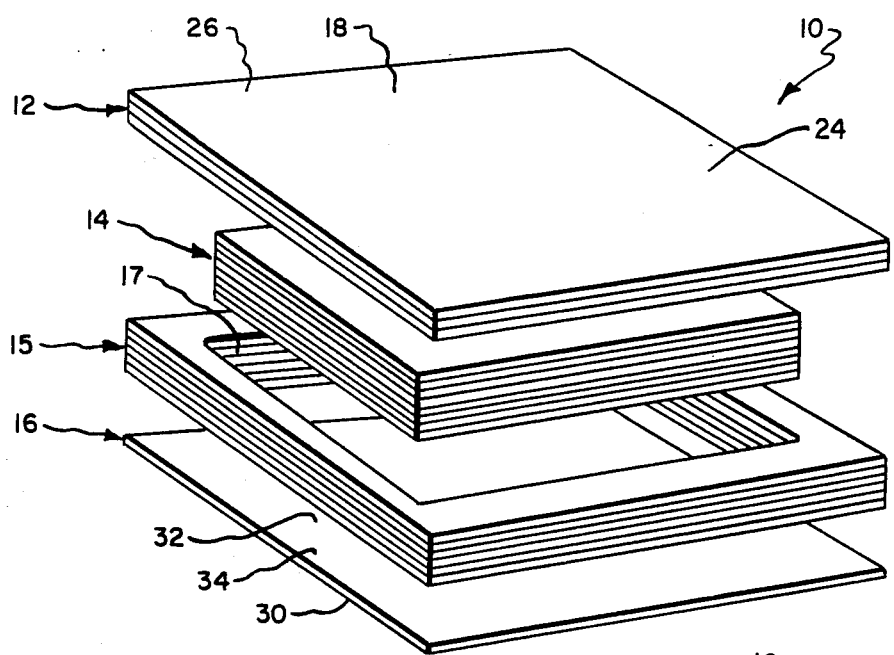
FIG. 1 is an exploded perspective view of a ballistic resistant armor panel comprising one embodiment of the present invention.
Figure 2:
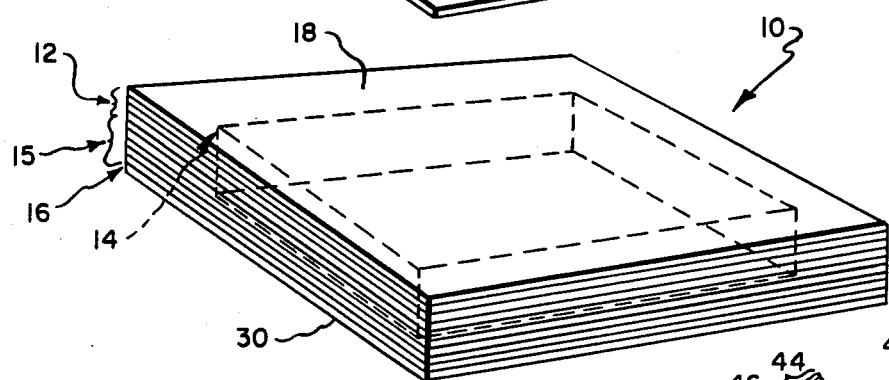
FIG. 2 is a perspective view of the assembled FIG. 1 armor panel.

Turning now to the drawings in greater detail, there is shown in FIGS. 1 and 2 a ballistic resistant panel, generally indicated 10, comprising one embodiment of the present invention. The panel 10 is comprised of a first layer 12 of resin-impregnated fabric, a second layer 14 of flexible woven fabric, a border layer 15 of resin-impregnated fabric, and a third layer 16 of resin-impregnated fabric. The first layer 12 is of such a composition of resin and fabric that it distributes or disperses the impact of a projectile which strikes its surface over a large area of the panel 10 and effectively contributes to the ballistic resistance of the panel 10. The second layer 14 of flexible woven fabric is encapsulated by the first, third and border layers.

The panel 10 is worn by a user so that the first layer 12 provides the outermost layer of panel protection from bullets or similar projectiles. For this reason, the first layer 12 of the panel 10 can be appropriately referred to as the front or outer layer of the panel. Defined by the first layer 12 on the side of the first layer opposite the second layer 14 is the front surface 18 of the panel 10.

With reference to FIG. 1, the first layer 12 is comprised of three plies of a relatively rigid, resin-impregnated fabric. Included in the first layer 12 is a central portion 24 and a marginal portion 26 which borders the central portion 24. The three plies of the first layer 12 are arranged in layup fashion and are uniformly impregnated with resin. In addition, the first layer 12 is waterproof so that no moisture is permitted to enter the second layer 14 of flexible woven fabric through the front surface 18 of the panel 10. The fabric of each ply of the first layer 12 is chosen from the group consisting of glass fabric, graphite fabric and carbon fabric, and the resin with which the fabric is impregnated is one of a number of suitable resins, such as a vinylester, polyester, or phenolformaldehyde resin. With regard to the choice of resin in the resin-impregnated fabric, however, it will be understood that armor in which the panel 10 is included is commonly expected to withstand a decontamination process in which the armor is submerged in boiling water. Therefore, the resin with which the fabric of the first layer 12 is impregnated should not degrade or soften when exposed to temperatures at or about 212° F. (100° C.).

The composition of the first layer 12 provides a front finishing operations, such as sanding or painting. If the fabric of the first layer is impregnated with a resin which includes a small amount of titanium dioxide mixed therein, paint adheres to the front layer in such a manner that any need for a coat of priming before an outside layer of paint is applied is obviated. It has been found that a mixture of any of the aforedescribed resins with an amount of titanium dioxide equivalent to about one percent by weight of the total mixture provides a resulting resin composition with suitable paintadhering qualities and does not adversely effect the ballistic characteristics of the first layer.

The second layer 14 includes eight plies, arranged in layup fashion, of a flexible fabric woven of an aramid fiber of the type or equivalent to the type produced by E.I. Du Pont de Nemours & Company under the tradename Kevlar. Kevlar fibers are produced and sold by Du Pont in the form of roving and yarns of various Denier and are capable of being woven into any of a number of various weaves. It has been found that a plain weave fabric constructed of 1000 or 1500 Denier yarn provides the plies of the second layer with satisfactory ballistic resistance.

The border layer 15 includes six plies of a relatively rigid, resin-impregnated fabric. The fabric within each ply of the border layer 15 can be any of a number of suitable fabrics, such as glass fabric, graphite fabric or carbon fabric, and the resin with which each ply of the border layer is impregnated can be any of a number of suitable resins, such as a polyester resin. Each ply of the border layer is in the shape of a rectangular frame and spread in overlying relationship with one another. The opening, indicated 17, defined by the border layer 15 nestingly accepts the second layer 14. The thickness of the border layer 15 is generally the same as that of the second layer 14, and the border layer 15 is waterproof.

The third layer 16 includes a single ply of a relatively rigid, resin-impregnated fabric. Included in the third layer is a central portion 32 and a marginal portion 34 which borders the central portion 32. The third layer 16 is waterproof so that it provides a waterproof back layer of the panel 10. The fabric of the third layer can be any of a number of suitable fabrics, such as glass fabric, graphite fabric or carbon fabric, and the resin with which the fabric of the third layer is impregnated can be any of a number of suitable resins, such as a polyester resin. As discussed above, however, with regard to the choice of resin of the first layer 12, the resin with which the fabric of the third layer 16 is impregnated should not degrade or soften when exposed to temperatures at or about 212° F. (100° C.). The composition of the third layer 16 provides a surface 30, or a lower surface as shown, which is well-suited for panel finishing operations, such as sanding or painting. Furthermore and as discussed above with regard to the first layer, if a small amount of titanium dioxide is mixed into the resin and then the fabric of the third layer is impregnated therewith, the third layer does not require a coat of priming before an outside layer of paint is applied.

In accordance with the panel 10 of the present invention and with reference to FIG. 2, the first layer 12 is comprised of such a composition of resin and fabric that the first layer 12 distributes the impact of a projectile which strikes its surface over a large area of the first layer 12 and effectively resists penetration by the projectile. To this end, various resins have been found to be well-suited for impregnating the various fabrics of which the first layer 12 can be comprised, and the resin composition by weight in suitable fiber/resin combinations comprising the first layer 12 has been determined. More specifically, if the fabric of the first layer 12 is glass fabric, the resin with which the fabric is impregnated can be either a vinylester resin or a polyester resin, and the percentage by weight of resin in the composition of the first layer is in the range of about 20 to 25 percent. If the fabric of the first layer 12 is graphite fabric, the resin with which the fabric is impregnated can be either a polyester resin or a phenol-formaldehyde resin, and the percentage by weight of resin in the composition of the first layer is in the range of about 18 to 23 percent. If the fabric of the first layer 12 is carbon fabric, the resin with which the fabric is impregnated can be a polyester resin, and the percentage by weight of the polyester resin in the composition of the first layer is in the range of about 18 to 23 percent.

It is believed that the capacity of the first layer 12 to perform the tasks of distributing the impact of a projectile over a large area and effectively resisting the penetration of a projectile is due, at least in part, to the degree of rigidity of the first layer 12, and each of the aforementioned suitable compositions of fabric and resin in the first layer 12 provides the first layer with a degree of rigidity to effectuate these tasks.

The second layer 14 of flexible woven fabric is positioned within the opening of the border layer 15 and sandwiched between the central portions 24 and 32 of the first and third layers 12 and 16, respectively. The first layer 12, border layer 15 and third layer 16 are positioned relative to one another so that the border layer 15 overlies the marginal portion 34 of the third layer 16 and the marginal portion 26 of the first layer 12 overlies the border layer 15.

In accordance with the panel of this invention, the border layer 15 and the marginal portions 26 and 34 of the first and third layers 12 and 16, respectively, are bonded together to form a waterproof seal along the edge of the panel 10. It follows from the above that the first layer 12, border layer 15 and third layer 16 completely encapsulate the second layer 14 of flexible woven fabric and thereby protect the second layer 14 from a service or decontamination environment which could otherwise wet the plies of woven fabric and thereby reduce the ballistic resistance of the second layer 14.

When a projectile strikes the front surface 18 of the panel 10, the first layer 12 distributes the impact of the projectile over a large area of the panel 10 and thereby minimizes the blunt trauma in body armor in which the panel 10 is utilized. An additional advantage provided by the structure of the panel 10 relates to the backface signature, hereinafter defined, produced by a projectile which strikes body armor in which the panel 10 is used.

Backface signature in body armor refers to the protuberance defined in the inner surface of the armor caused by a projectile which strikes the armor. If such a protuberance is permitted to strike the body of a wearer, injury can result. Thick layers of padding can be placed between the inner surface of the armor and the body of the wearer to protect the wearer from such a protuberance, but thick layers of padding are undesirable in that they contribute to the bulkiness and weight of the wearer's protective system. It is believed that the chances of injury to the wearer of body armor by backface signature are reduced as the backface signature is blunted. In other words, injury to a wearer is less likely to result from a protuberance which is short in length and spread over a broad area than one which is long in length and sharp. The backface signature produced by a projectile which strikes the panel 10 is short in depth and spread over a broad area. Therefore the chances of injury from backface signature to a wearer of body armor in which the panel 10 is used is minimized.

The method of the present invention includes the steps involved in constructing the panel 10. Firstly, the third layer 16 is provided and is placed in spread condition. The second layer 14 is then spread over the third layer 16 so as to overlie the central portion 32 of the third layer 16. The border layer 15 is then placed upon the marginal portion 34 of the third layer 16 so that the second layer 14 is positioned within its opening 17. The first layer 12 is then placed over the second layer 14 and the border layer 15 so that its central portion 24 overlies the second layer 14 and its marginal portion 26 overlies the border layer 15. The marginal portions 26 and 34 and border layer 15 are thereafter bonded together by the application of heat and pressure to the marginal portions. The applied heat softens the resin within the marginal portions 26 and 34 and border layer, and the applied pressure joins the softened resin of the marginal portions 26 and 34 and border layer 15. A watertight seal is thereby formed between the marginal portion 26 and the border layer 15 and between the border layer 15 and marginal portion 34.

For ease of fabrication of the panel 10, it may be desirable to bond the marginal portions 26 and 34 and border layer 15 by applying heat and pressure over the entire area of the panel. It has been found, however, that if this is done, a small amount of the resin within the first layer 12 and the third layer 16 migrates or bleeds into the second layer 14. Therefore, if the marginal portions 26 and 34 are bonded by the application of heat and pressure over the entire area of the panel 10, it is desirable to provide, prior to this bonding process, plies of the first and third layers having a percentage composition by weight of resin which is slightly greater than the desired percentage composition by weight of resin in the completed panel 10 to compensate for the small amount of resin which leaves the first and third layers during such a bonding process.

Figure 3:
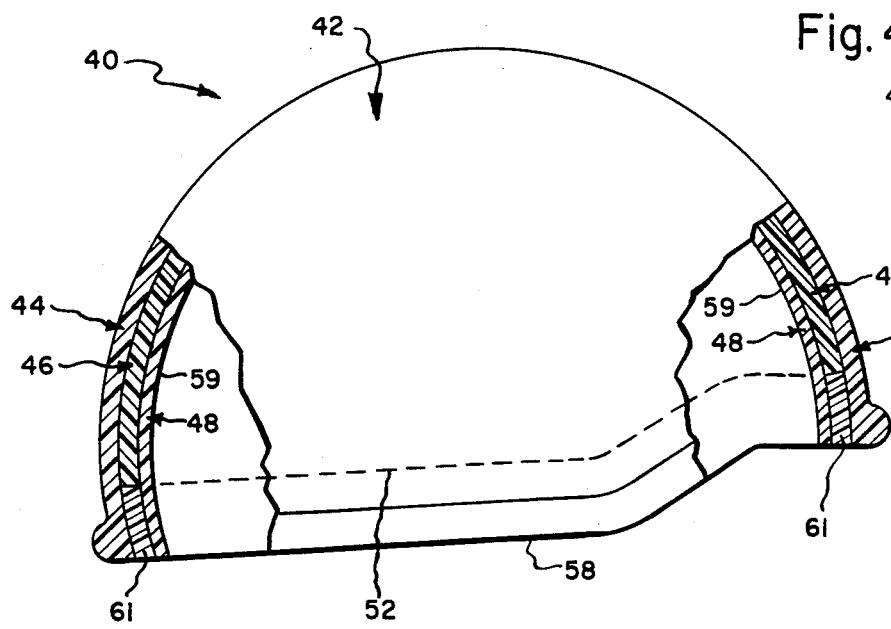
FIG. 3 is an elevational view of a helmet, shown partially cut-away, in which a panel comprising another embodiment of the present invention is included.
Figure 4:
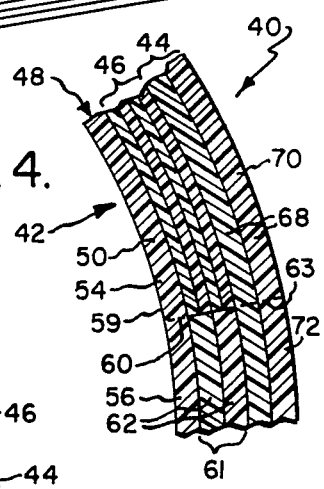
FIG. 4 is a view of a cut-away portion of the FIG. 3 helmet, drawn to a slightly larger scale.

Referring to FIGS. 3 and 4, there is shown a ballastic resistant helmet 40 in which a panel structure or system in accordance with the present invention is incorporated. The helmet 40 is comprised basically of a shell portion 42 and an adjustable band or strap type head engaging means (not shown) supported within the shell portion 42. The shell portion 42 is substantially semi-spherical in shape and is of such size that when worn by a user, the helmet protects a substantial portion of the user's head from injury by bullets, shrapnel or similar projectiles. The strap type head engaging means of the helmet is fastened against the interior of the shell portion 42 in a manner well-known in the art and provides the means by which the helmet is worn comfortably by the user.

The shell portion 42 of the helmet 40 is comprised of a layered panel structure including an outer, or first, layer 44, a core, or second, layer 46 and an inner, or third, layer 48. The inner layer 48 includes a single semi-spherical shaped ply 50 of a relatively rigid, resin-impregnated fabric. The fabric of the inner layer 48 can be any of a number of suitable fabrics, such as glass fabric, graphite fabric or carbon fabric, and the resin of the inner layer 48 can be any of a number of suitable resins, such as a polyester resin. The ply of fabric of the inner layer 48 of FIGS. 3 and 4 includes a central portion 54 and a marginal portion 56. For purposes of illustration, there is shown in FIG. 4 a dotted line 60 at which the marginal portion 54 and central portion 56 of the FIG. 3 a dotted line 52 along which the border of the marginal portion 54 and central portion generally follow. Furthermore, the marginal portion 56 extends from the boundary of the central portion 54 to the lower edge, indicated 58, of the helmet 40. The inner layer 48 defines a smooth inner surface, indicated 59, of the helmet shell portion 42 and is well-suited for finishing operations, such as sanding or painting.

The core layer 46 of the helmet shell portion 42 includes four plies of a flexible fabric woven of an aramid fiber, discussed above with regard to the second layer 14 of the panel 10 of FIGS. 1 and 2, and overlies the central portion 54 of the inner layer 48 so that its edge generally follows alongside the border of the central portion 54 and the marginal portion 56 of the inner layer 48 and, thus, along the dotted line 52 shown in FIG. 3.

Also included in the helmet shell portion 42 is a border layer 61 comprised of a layup of two narrow plies 62,62 of resin-impregnated fabric positioned in overlying relationship with the marginal portion 56 of the inner layer 48 and which extends therealong between the edge of the core layer 46 and the lower edge 58 of the helmet 40. The fabric in each ply of the border layer 61 can be any number of suitable fabrics, such as graphite fabric, glass fabric or carbon fabric, and the resin in each ply of the border layer 61 can be any of a number of suitable resins, such as a polyester resin. The border layer 61 thickens the region of the helmet shell portion 42 between the edge of the core layer 46 and the lower edge 58 of the helmet so that this region is at least as thick as any other region of the helmet 40.

The outer layer 44 includes two plies 68,68 of a relatively rigid resin-impregnated fabric and includes a central portion 70 and a marginal portion 72. The fabric within each ply of the outer layer 44 is chosen from the group consisting of glass fabric, graphite fabric and carbon fabric, and the resin with which the fabric of the outer layer 44 is impregnated is any of a number of suitable resins, such as a vinylester, polyester, or phenolformaldehyde resin. The outer layer 44 of the helmet shell portion 42 distributes the impact of a projectile over a broad area of the helmet 40 and effectively contributes to the ballistic resistance of the helmet 40. Accordingly, the suitable fiber/resin combinations listed above in regard to the plies of the first layer 12 of the panel 10 of FIGS. 1 and 2 are suitable combinations of fiber and resin of each ply of the outer layer 44, and the percentage composition by weight of resin in each of the suitable fiber/resin combinations set forth above in regard to the composition of the first layer 12 applies here to the outer layer 44. The composition of the outer layer 44 provides an outer surface of the helmet shell portion 42 which is wellsuited for finishing operations, such as sanding or painting.

For purposes of illustration, there is shown in FIG. 4 a dotted line 63 at which the central portion 70 and marginal portion 72 of the outer layer 44 border one another. The border between the central portion 70 and marginal portion 72 generally follows along the dotted line 52 of FIG. 3. Furthermore, the marginal portion 72 extends from the boundary of the central portion 70 to the lower edge 58 of the helmet 40. The outer layer 44 overlies the core layer 46 and the border layer 61 so that the core layer 46 is positioned between the central portions 54 and 70 of the inner and outer layers 48 and 44, respectively, and so that the border layer 61 is positioned between the marginal portions 56 and 72 of the inner and outer layers 48 and 44, respectively.

The border layer 61, the marginal portion 56 of the inner layer 48 and the marginal portion 72 of the outer layer 44, are bonded together by the application of heat and pressure applied to the marginal portions. The applied heat softens the resin within the border layer 61 and the marginal portions 56,72, and the applied pressure joins the heat-softened resin of the marginal portions and border layer. A watertight seal is thereby formed along the lower edge 58 of the helmet 40. It follows from the above that the core layer 46 is encapsulated by the inner layer 48, border layer 61 and outer layer 44 and is thereby protected from a service or decontamination environment which could otherwise wet the woven fabric within the core layer 46.

To construct the shell portion 42 of the helmet 40, the inner layer 48, being substantially semi-spherical in shape, is provided. The core layer 46 is then placed over the inner layer 48 so as to overlie the central portion 54 of the inner layer 48. The border layer 61 is then placed over and along the marginal portion 56 of the inner layer 48. The outer layer 44, being substantially semispherical in shape, is thereafter placed over the core layer 46 and border layer 61 so that its central portion 70 overlies the core layer 46 and its marginal portion 72 overlies the border layer 61. Heat and pressure are then applied to the marginal portions 56 and 72 of the inner and outer layers 48 and 44, respectively, so that the border layer 61 and the marginal portions 56 and 72 bond with one another and thereby form a watertight seal therebetween.

An illustrative process of bonding the marginal portions 56 and 72 and border layer 61 together is initiated by placing the assembled layers of the helmet shell portion 42 into a heated metal-surfaced mold with the outer layer 44 engaging the surface of the mold. The mold surface is in the shape of the outer shape of the helmet shell portion 42 and is maintained at about 265° F.–285° F. (129° C.–141° C.). An inflatable rubber bag is then placed inside the helmet and inflated to about 25 pounds per square inch so that the bag presses the helmet against the heated surface of the mold. It has been found that when exposed to heat and pressure under conditions as aforedescribed, the marginal portions 56 and 72 and border layer 61 are suitably bonded in about seven to fourteen minutes.

The ballistic resistance of the helmet 40 is sufficient to defeat many conventional small arms projectiles.

It will be understood that numerous modifications can be had to the aforedescribed embodiments without departing from the spirit of the invention. For example, although the shell portion 42 of the helmet 40 of FIGS. 3 and 4 has been described as including layers which each have a stated number of plies, a helmet shell portion in accordance with the panel of the present invention can include layers which have an alternative number of plies. A helmet shell portion comprised of a first, or outer layer having three plies of resin-impregnated fabric, a second, or core layer having eight plies of woven fabric, a border layer having three plies of resin-impregnated fabric, and a third, or inner layer having one ply of resin-impregnated fabric is in accordance with this invention as well, and, like the helmet shell portion 42, can defeat many conventional small arms projectiles.

Furthermore, although the panel of the present invention can be used to form the shell portion of a helmet, as discussed above with regard to the helmet 40 of FIGS. 3 and 4, the panel can also be used to form a bullet-proof vest or any structure requiring ballastic penetration resistance Accordingly, the descriptions contained herein are intended as illustration and not as limitation.

We claim:
1. A ballistic resistant panel comprising:
a first layer including a plurality of plies of resin-impregnated fabric;

a second layer including at least one ply of flexible woven fabric supported adjacent said first layer; and a third layer including at least one ply of resin-impregnated fabric supported adjacent said second layer opposite said first layer, said second layer being smaller in area than said first and third layers, said first and third layers each having a central portion and a marginal portion which borders said central portion, said second layer being positioned between said central portions of said first and third layers and said marginal portions being bonded together whereby said second layer is encapsulated between said first and third layers.

2. A ballistic resistant panel as defined in claim 1 wherein the resin of said resin-impregnated fabric of at least one of said first and third layers includes a small amount of titanium dioxide.

3. A ballistic resistant panel as defined in claim 1 wherein the percentage by weight of titanium dioxide in the resin of said layers including titanium dioxide is about one percent.

4. A ballistic resistant panel as defined in claim 1 wherein said flexible woven fabric is woven of a ballistic-resistant material which must be protected from a wet environment to maintain its ballistic resistant characteristics.

5. A ballistic resistant panel as defined in claim 1 wherein said flexible woven fabric is woven of an aramid fiber.

6. A ballistic resistant panel as defined in claim 1 further comprising:

a border layer including at least one ply of resin-impregnated fabric positioned and bonded between said marginal portions of said first and third layers whereby said first layer, border layer and third layer collectively encapsulate said second layer.

7. A ballistic resistant panel comprising:

a first layer including a plurality of plies of resin-impregnated fabric and having a first central portion and a first marginal portion, said marginal portion bordering said first central portion;

a second layer including at least one ply of flexible woven fabric adjacent said first central portion; and a third layer including at least one ply of resin-impregnated fabric and having a second central portion and a second marginal portion, said second marginal portion bordering said second central portion, said third layer adjacent the side of said second layer opposite said first layer, said second layer positioned between said first central portion and said second central portion, and said first and second marginal portions being bonded together whereby said second layer is encapsulated between said first layer and said third layer.

8. A ballistic resistant panel as defined in claim 7 further comprising a border layer including at least one ply of resin-impregnated fabric positioned between said first and second marginal portions and extending therealong, said border layer being bonded on one side to said first marginal portion and being bonded on another side to said second marginal portion so that said first layer, border layer and third layer collectively encapsulate said second layer.

9. A ballistic resistant panel as defined in claim 7 wherein said flexible woven fabric is woven of an aramid fiber.

10. A method of constructing a ballistic resistant panel comprising the steps of:

providing a first layer including a plurality of plies of resin-impregnated fabric and having a first central portion and a first marginal portion, said first marginal portion bordering said first central portion;

providing a second layer including at least one ply of flexible woven fabric;

providing a third layer including at least one ply of resin-impregnated fabric and having a first central portion and a first marginal portion, said second marginal portion bordering said second central portion;

spreading said second layer in overlying relationship with said second central portion of said third layer;

spreading said first layer in overlying relationship with said second layer and said third layer so that said first central portion overlies said second layer; and bonding said first and second marginal portions together so that said second layer is encapsulated between said first layer and said third layer.

11. A method as defined in claim 10 wherein the step of spreading said second layer in overlying relationship with said third layer is followed by the steps of:

providing a border layer including at least one narrow ply of resin-impregnated fabric; and spreading said border layer in overlying relationship with said second marginal portion so that said border layer is positioned between the edge of said second layer and the edge of said third layer, and wherein the step of spreading said first layer in overlying relationship with said second and third layers positions said border layer between said first and second marginal portions and the step of bonding said first and second marginal portions together bonds said border layer therebetween.

12. A method as defined in claim 10 wherein the step of bonding comprises:

heating said first and second marginal portions; and pressing said marginal portions together.

13. A method as defined in claim 10 wherein said resin-impregnated fabric of said first layer includes such a composition of resin and fabric that the impact of a projectile which strikes its surface is distributed over a large area of said first layer and effective ballistic resistance is provided by said first layer.

* * * * *